US012489490B2

(12) United States Patent
Fukuzono et al.

(10) Patent No.: US 12,489,490 B2
(45) Date of Patent: Dec. 2, 2025

(54) DISTRIBUTED ANTENNA SYSTEM, WIRELESS COMMUNICATION METHOD, AND CENTRALIZED STATION

(71) Applicant: NTT, Inc., Tokyo (JP)

(72) Inventors: Hayato Fukuzono, Musashino (JP); Keita Kuriyama, Musashino (JP); Masafumi Yoshioka, Musashino (JP); Toshifumi Miyagi, Musashino (JP)

(73) Assignee: NTT, Inc., Tokyo (JP)

( * ) Notice: Subject to any disclaimer, the term of this patent is extended or adjusted under 35 U.S.C. 154(b) by 313 days.

(21) Appl. No.: 18/260,483

(22) PCT Filed: Jan. 7, 2021

(86) PCT No.: PCT/JP2021/000387
§ 371 (c)(1),
(2) Date: Jul. 6, 2023

(87) PCT Pub. No.: WO2022/149245
PCT Pub. Date: Jul. 14, 2022

(65) Prior Publication Data
US 2024/0072847 A1    Feb. 29, 2024

(51) Int. Cl.
*H04B 7/022* (2017.01)
*H04B 7/024* (2017.01)
*H04B 7/0408* (2017.01)
*H04B 7/0452* (2017.01)
*H04J 1/00* (2006.01)

(52) U.S. Cl.
CPC ........... *H04B 7/022* (2013.01); *H04B 7/0408* (2013.01)

(58) Field of Classification Search
CPC .............................. H04B 7/022; H04B 7/0408
USPC ......................................................... 370/328
See application file for complete search history.

(56) References Cited

U.S. PATENT DOCUMENTS

| | | | | |
|---|---|---|---|---|
| 2012/0329498 A1* | 12/2012 | Koo | ...................... | H04W 72/12 455/501 |
| 2015/0146561 A1* | 5/2015 | Jung | ...................... | H04B 7/024 370/252 |
| 2019/0280763 A1* | 9/2019 | Smyth | ................ | H04B 7/18513 |

OTHER PUBLICATIONS

Takeda et al., "NR Physical Layer Specification in 5G", Ntt Docomo Technical Journal, vol. 26 No. 3, Nov. 2018, pp. 47-58 (24 p. including English Translation).

* cited by examiner

*Primary Examiner* — Xuan Lu
(74) *Attorney, Agent, or Firm* — XSENSUS LLP

(57) ABSTRACT

An aggregation station: receives, from each of the base stations, communication path information with each of accommodated user terminals, for each user terminal; in a case where it is determined that the two of the base stations and the two user terminals are arranged on the straight line, generates first information for performing setting such that a transmission beam of any one of the base stations arranged on the straight line is stopped and another of the base stations non-orthogonally superimposes and multiplexes pieces of transmission data for the two respective user terminals with a predetermined power difference or power ratio; and controls the transmission beam of each of the two of the base stations arranged on the straight line on the basis of the first information.

6 Claims, 7 Drawing Sheets

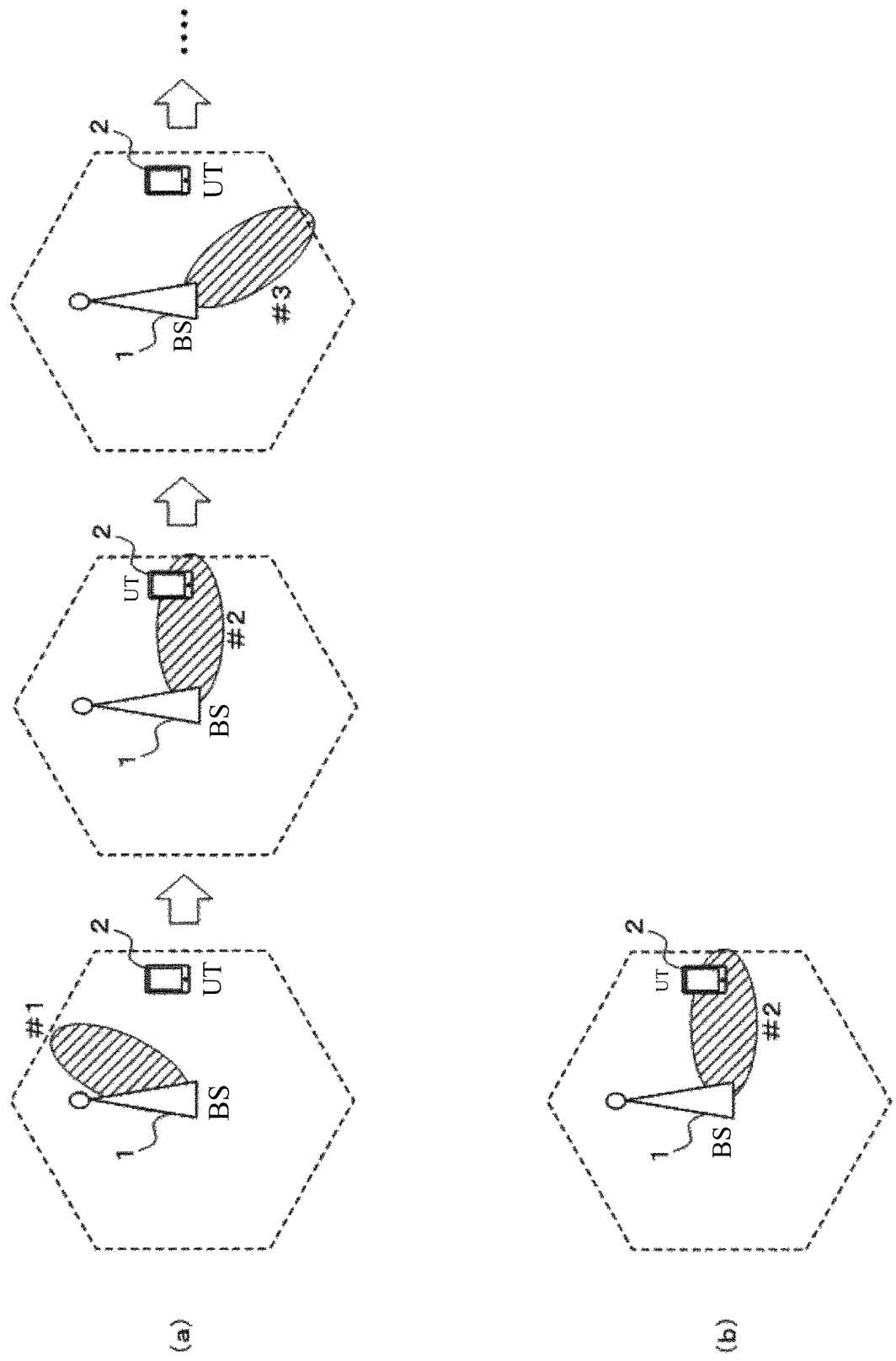

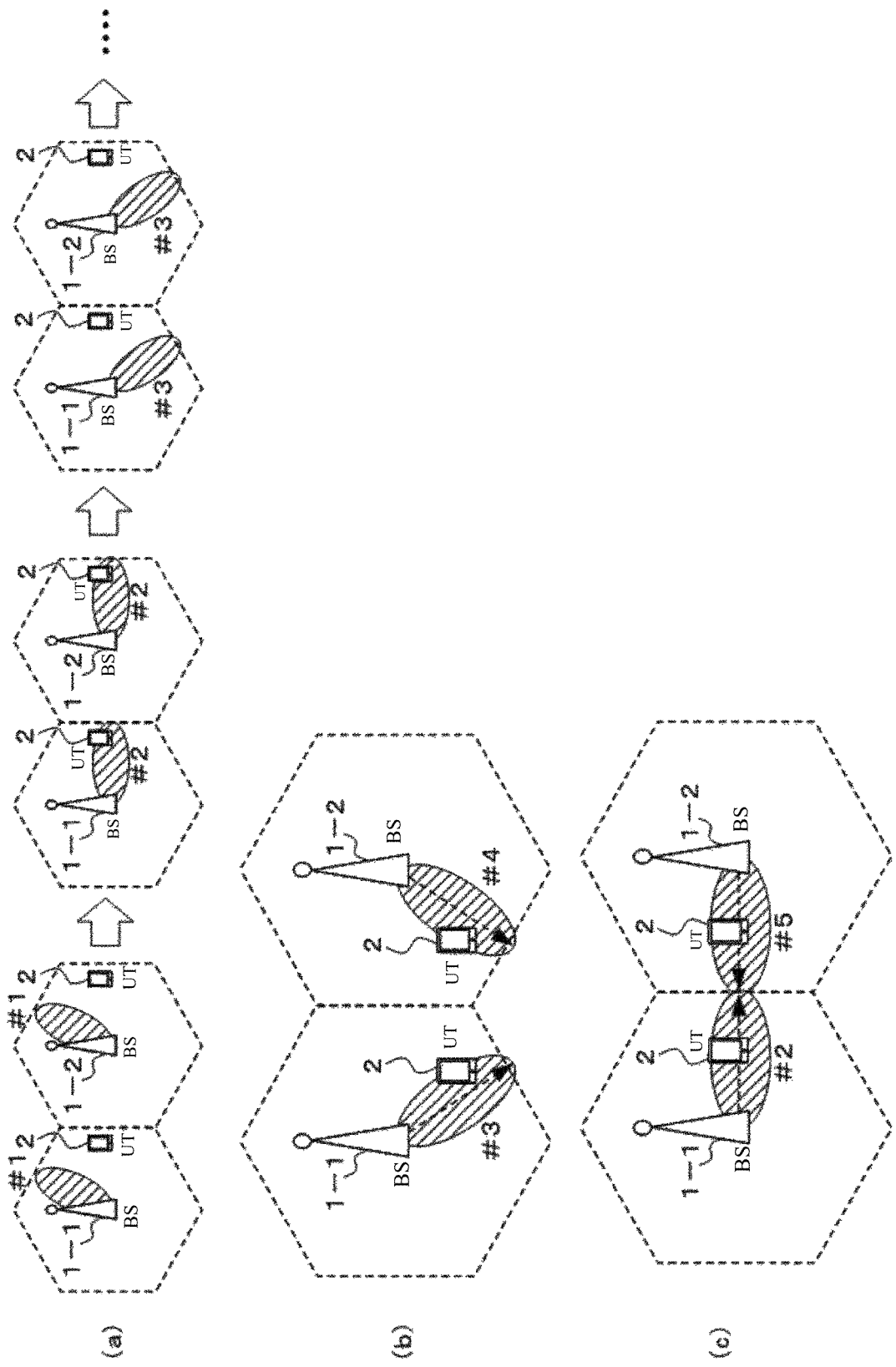

DISTRIBUTED ANTENNA SYSTEM, WIRELESS COMMUNICATION METHOD, AND CENTRALIZED STATION

CROSS-REFERENCE TO RELATED APPLICATION

The present application is based on PCT filing PCT/JP2021/000387, filed Jan. 7, 2021, the entire contents of which are incorporated herein by reference.

TECHNICAL FIELD

The present invention relates to a distributed antenna system, a wireless communication method, and an aggregation station.

BACKGROUND ART

In a wireless communication system such as a fifth generation mobile communication system (5G), massive multiple input multiple output (MIMO) using a multi-element antenna, non-orthogonal multiple access (NOMA), and the like are known as techniques for improving frequency utilization efficiency.

For example, in an environment (high-density environment) in which 5G base stations are densely arranged, each base station performs beam search as initial access of New Radio (NR). At this time, each base station sequentially transmits a synchronization signal block (Synchronization Signals (SS)/Physical Broadcast CHannel (PBCH) block) by an analog beam having directivity in each surrounding direction, adopts a beam in a direction in which received power is the highest, and starts data communication (for example, see Non Patent Literature 1).

In addition, a distributed antenna system (DAS) is known as a system that enables more efficient MIMO transmission.

CITATION LIST

Non Patent Literature

Non Patent Literature 1: Kazuki Takeda and five others, "NR Physical Layer Specification in 5G", NTT DOCOMO Technical Journal, Vol. 26 No. 3 (November 2018), p. 47-58

SUMMARY OF INVENTION

Technical Problem

However, when each base station densely arranged similarly performs beam search and determines a beam to be adopted, for example, in a case where there is a positional relationship in which a plurality of base stations and a plurality of user terminals (UEs) are arranged on a straight line, there has been a problem that mutual radio wave interference is caused.

The present invention has been made in view of the above-described problem, and an object thereof is to provide a distributed antenna system, a wireless communication method, and an aggregation station capable of preventing radio wave interference even in a case where there is a positional relationship in which a plurality of base stations and a plurality of user terminals are arranged on a straight line.

Solution to Problem

A distributed antenna system according to an aspect of the present invention is a distributed antenna system including: a plurality of base stations that performs MIMO transmission to user terminals at an identical frequency; and an aggregation station that aggregates pieces of information used by the respective base stations, in which the aggregation station includes: a reception unit that receives, from each of the base stations, communication path information with each of accommodated user terminals, for each user terminal; a determination unit that determines whether or not two of the base stations and two user terminals are arranged on a straight line on the basis of the communication path information for each user terminal received by the reception unit; a NOMA processing unit that performs, in a case where the determination unit determines that the two of the base stations and the two user terminals are arranged on the straight line, first processing of generating first information for performing setting such that a transmission beam of any one of the base stations arranged on the straight line is stopped and another of the base stations non-orthogonally superimposes and multiplexes pieces of transmission data for the two respective user terminals with a predetermined power difference or power ratio, or second processing of generating second information for performing setting such that each of the two of the base stations arranged on the straight line non-orthogonally superimposes and multiplexes pieces of transmission data for the two respective user terminals with a predetermined power difference or power ratio to increase gains for the respective user terminals by cooperation of transmission beams transmitted by the two of the base stations to the two respective user terminals; and a control unit that controls the transmission beam of each of the two of the base stations arranged on the straight line on the basis of the first information or the second information.

In addition, a wireless communication method according to an aspect of the present invention is a wireless communication method performed by a plurality of base stations that performs MIMO transmission to user terminals at an identical frequency and an aggregation station that aggregates pieces of information used by the respective base stations, the wireless communication method including: a reception step of receiving, from each of the base stations, communication path information with each of accommodated user terminals, for each user terminal, by the aggregation station; a determination step of determining whether or not two of the base stations and two user terminals are arranged on a straight line on the basis of the communication path information for each user terminal received; a NOMA processing step of performing, in a case where it is determined that the two of the base stations and the two user terminals are arranged on the straight line, first processing of generating first information for performing setting such that a transmission beam of any one of the base stations arranged on the straight line is stopped and another of the base stations non-orthogonally superimposes and multiplexes pieces of transmission data for the two respective user terminals with a predetermined power difference or power ratio, or second processing of generating second information for performing setting such that each of the two of the base stations arranged on the straight line non-orthogonally superimposes and multiplexes pieces of transmission data for the two respective user terminals with a predetermined power difference or power ratio to increase gains for the respective user terminals by cooperation of transmission beams transmitted by the two of the base stations to the two respective user terminals; and a control step of controlling the transmission beam of each of the two of the base stations arranged on the straight line on the basis of the first information or the second information.

In addition, an aggregation station according to an aspect of the present invention is an aggregation station that aggregates pieces of information used by a plurality of respective base stations that performs MIMO transmission to user terminals at an identical frequency, the aggregation station including: a reception unit that receives, from each of the base stations, communication path information with each of accommodated user terminals, for each user terminal; a determination unit that determines whether or not two of the base stations and two user terminals are arranged on a straight line on the basis of the communication path information for each user terminal received by the reception unit; a NOMA processing unit that performs, in a case where the determination unit determines that the two of the base stations and the two user terminals are arranged on the straight line, first processing of generating first information for performing setting such that a transmission beam of any one of the base stations arranged on the straight line is stopped and another of the base stations non-orthogonally superimposes and multiplexes pieces of transmission data for the two respective user terminals with a predetermined power difference or power ratio, or second processing of generating second information for performing setting such that each of the two of the base stations arranged on the straight line non-orthogonally superimposes and multiplexes pieces of transmission data for the two respective user terminals with a predetermined power difference or power ratio to increase gains for the respective user terminals by cooperation of transmission beams transmitted by the two of the base stations to the two respective user terminals; and a control unit that controls the transmission beam of each of the two of the base stations arranged on the straight line on a basis of the first information or the second information.

Advantageous Effects of Invention

According to the present invention, radio wave interference can be prevented even in a case where there is a positional relationship in which a plurality of base stations and a plurality of user terminals are arranged on a straight line.

BRIEF DESCRIPTION OF DRAWINGS

FIG. 6(a) is a diagram schematically illustrating an operation example in a case where a base station performs beam search. In (b), a diagram schematically illustrates a state in which a beam to be adopted by the base station is determined.

FIG. 7(a) is a diagram schematically illustrating an operation example in a case where a plurality of base stations in a high-density environment performs beam search as initial access of NR. In (b), a diagram schematically illustrates a state in which the plurality of base stations has determined beams to be adopted without causing radio wave interference. In (c), a diagram schematically illustrates a state in which beams adopted by the plurality of base stations cause radio wave interference.

DESCRIPTION OF EMBODIMENTS

Figure 1:
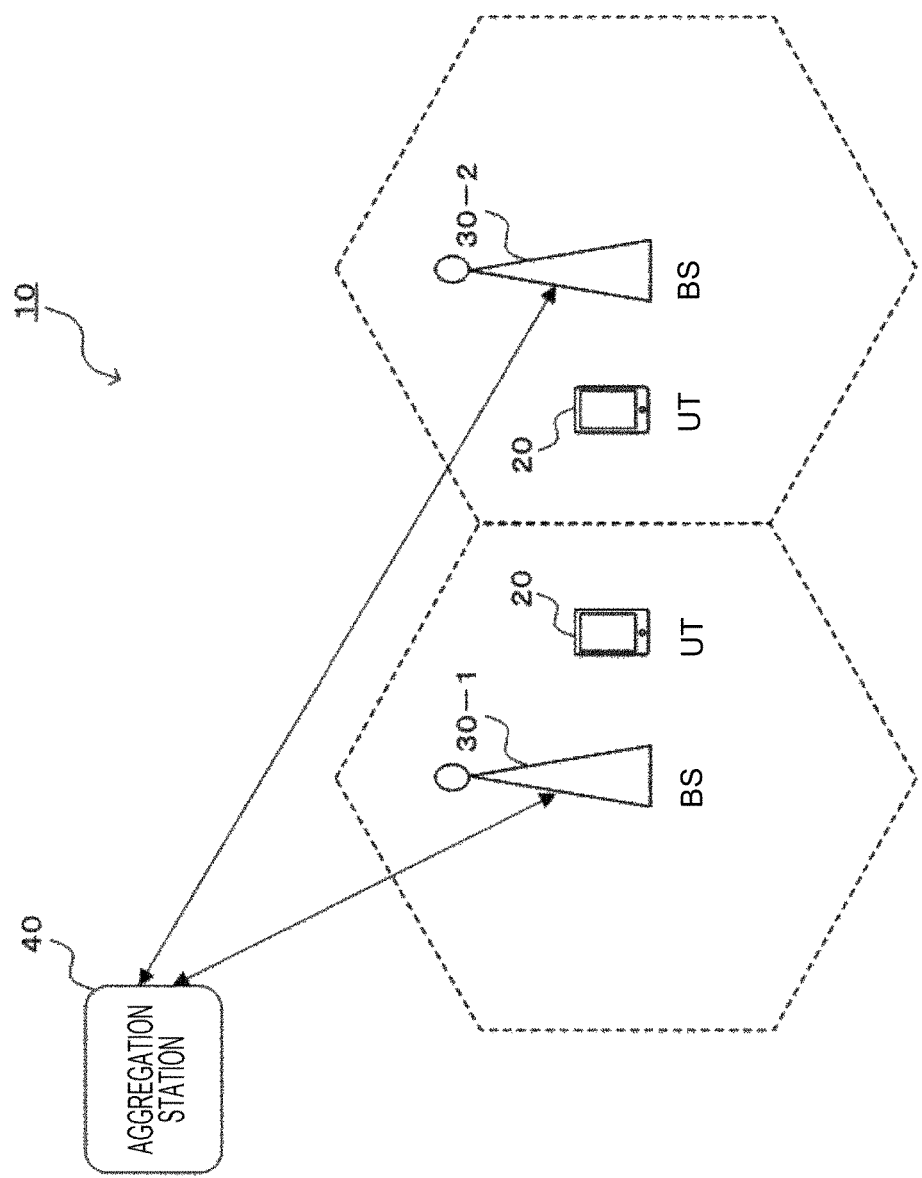
FIG. 1 is a diagram illustrating a configuration example of a distributed antenna system according to an embodiment.

First, background of the present invention will be described. FIG. 6 is a diagram schematically illustrating an operation example in a case where a base station of 5G performs beam search as an initial access of NR and determines a beam to be adopted. FIG. 6(a) is a diagram schematically illustrating an operation example in a case where the base station performs beam search. FIG. 6(b) is a diagram schematically illustrating a state in which a beam to be adopted by the base station is determined.

As illustrated in FIG. 6(a), a base station 1 applies, for example, a plurality of synchronization signal blocks (SS/PBCH blocks) to a plurality of beams having directivity in different directions, transmits the beams sequentially (in the order of a beam #1, a beam #2, a beam #3, . . . ) in respective surrounding directions, and searches for a position of a user terminal 2.

Then, as illustrated in FIG. 6(b), the base station 1 adopts the beam #2 in a direction in which received power from the user terminal 2 is the highest, and starts data communication.

FIG. 7 is a diagram schematically illustrating an operation example in a case where a plurality of base stations in a high-density environment performs beam search as initial access of NR and determine a beam to be adopted. FIG. 7(a) is a diagram schematically illustrating an operation example in a case where the plurality of base stations in the high-density environment performs beam search as initial access of NR. FIG. 7(b) is a diagram schematically illustrating a state in which the plurality of base stations has determined beams to be adopted without causing radio wave interference. FIG. 7(c) is a diagram schematically illustrating a state in which beams adopted by the plurality of base stations cause radio wave interference.

As illustrated in FIG. 7(a), a base station 1-1 and a base station 1-2 transmit, for example, beams of the same frequency sequentially (in the order of the beam #1, the beam #2, the beam #3, . . . ) in respective surrounding directions, and search for the user terminal 2 in respective cells.

As illustrated in FIG. 7(b), in a case where the base station 1-1 adopts the beam #3 and the base station 1-2 adopts the beam #4, a direction of the beam #3 emitted by the base station 1-1 is different from a direction of the beam #4 emitted by the base station 1-2, and radio wave interference is not caused.

On the other hand, as illustrated in FIG. 7(c), in a case where the base station 1-1 adopts the beam #2 and the base station 1-2 adopts the beam #5, there is a positional relationship in which the base station 1-1, the user terminal 2 accommodated in the base station 1-1, the user terminal 2 accommodated in the base station 1-2, and the base station 1-2 are arranged on a straight line. In this case, the base station 1-1, the user terminal 2 accommodated in the base station 1-1, the user terminal 2 accommodated in the base station 1-2, and the base station 1-2 may cause mutual radio wave interference.

Thus, a distributed antenna system according to an embodiment to be described next is configured to have the following functions to be able to prevent radio wave interference even in a case where there is a positional relationship in which a plurality of base stations and a plurality of user terminals are arranged on a straight line.

FIG. 1 is a diagram illustrating a configuration example of a distributed antenna system 10 according to an embodiment. As illustrated in FIG. 1, the distributed antenna system 10 includes, for example, a base station 30-1 that accommodates a user terminal 20 in a cell, a base station 30-2 that accommodates a user terminal 20 in a cell, and an aggregation station 40.

The base station 30-1 and the base station 30-2 transmit, for example, beams of the same frequency sequentially in respective surrounding directions, and search for the user terminals 20 in respective cells. Then, the base station 30-1 and the base station 30-2 perform MIMO transmission at the same frequency to the user terminals 20 in their own cells as, for example, normal operation.

Hereinafter, in a case where any of a plurality of components such as the base station 30-1 and the base station 30-2 is not specified, it is simply abbreviated as the base station 30 or the like.

The aggregation station 40 aggregates pieces of information used by the respective base stations 30, performs distributed digital MIMO signal processing, and controls each of the base stations 30. At this time, the aggregation station 40 acquires communication path information (channel state information (CSI)) between each base station 30 and each user terminal 20. Then, each of the base stations 30 performs beam forming based on the communication path information.

Next, an operation example of the distributed antenna system 10 will be described in a case where there is a positional relationship in which a plurality of base stations 30 and a plurality of user terminals 20 are arranged on a straight line.

Figure 2:
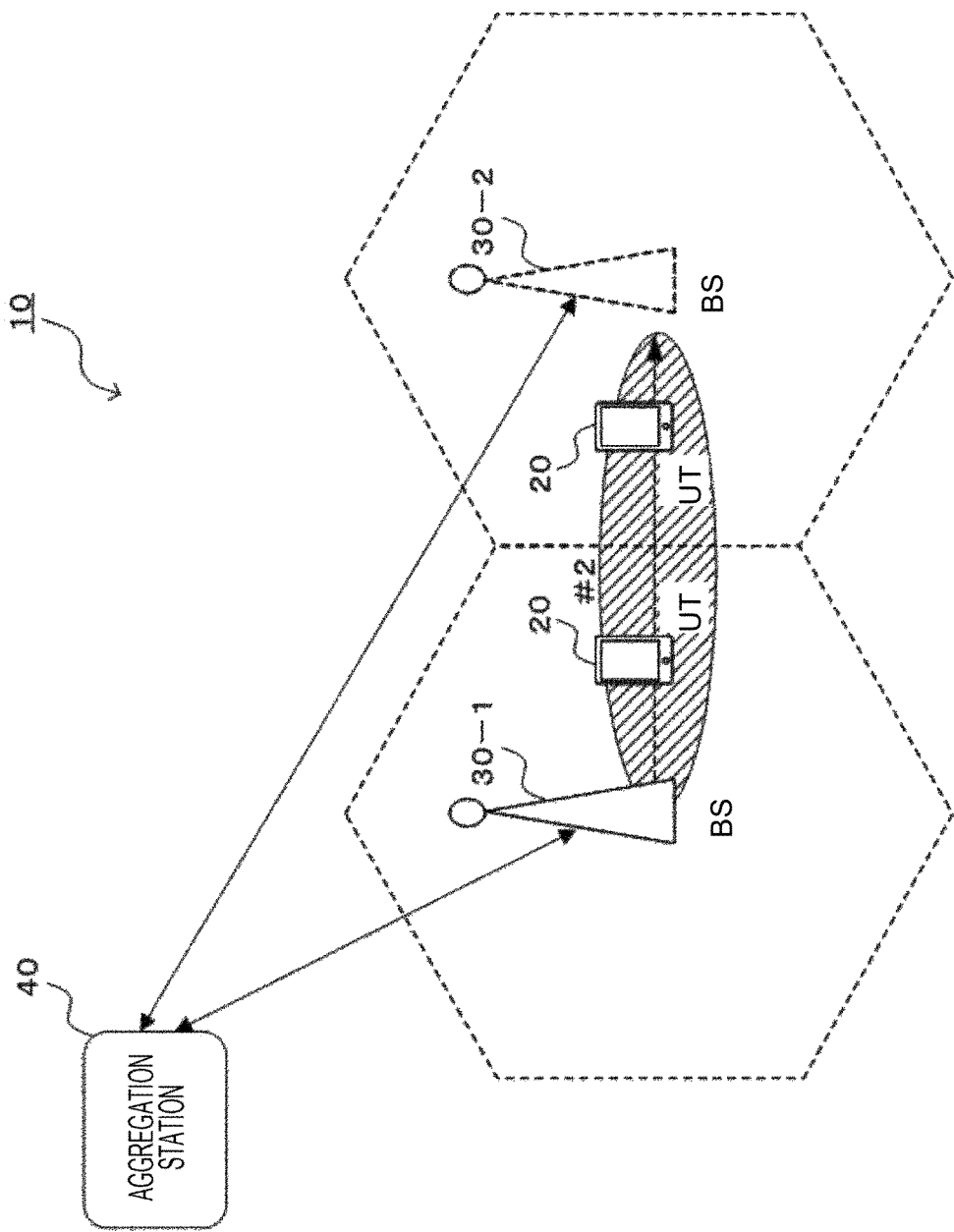
FIG. 2 is a diagram schematically illustrating a first operation example of the distributed antenna system in a case where there is a positional relationship in which a plurality of base stations and a plurality of user terminals are arranged on a straight line.

FIG. 2 is a diagram schematically illustrating a first operation example of the distributed antenna system 10 in the case where there is a positional relationship in which a plurality of base stations 30 and a plurality of user terminals 20 are arranged on a straight line.

In the first operation example of the distributed antenna system 10, the aggregation station 40 causes any one of the base stations 30 (for example, the base station 30-2) arranged on the straight line to stop a transmission beam. Then, the aggregation station 40 causes the other of the base stations 30 (for example, the base station 30-1) to output a transmission beam obtained by non-orthogonally superimposing and multiplexing pieces of transmission data for the two respective user terminals 20 with a predetermined power difference or power ratio (NOMA: see Non Patent Literature 2 below).

Non Patent Literature 2: Anass Benjebbour and two others, "Field Trials of Improving Spectral Efficiency by Using a Smartphone-sized NOMA Chipset", NTT DOCOMO Technical Journal, Vol. 26 No. 1 (April 2018), p. 6-15

At this time, the aggregation station 40 allocates, for example, the total power (for two base stations 30) to the base station 30-1. Then, each of the user terminals 20 performs demodulation using the non-orthogonal multiple access scheme.

Figure 3:
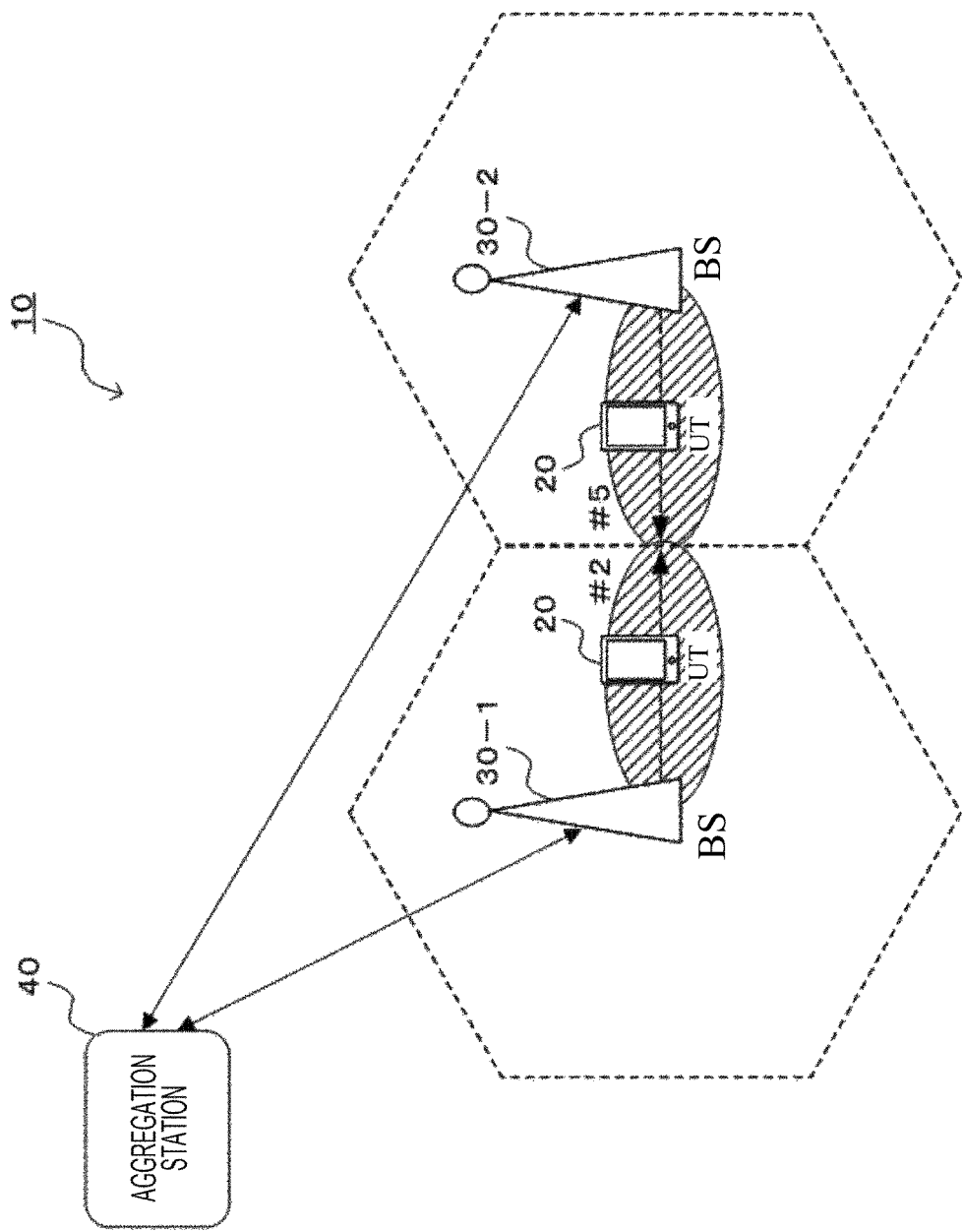
FIG. 3 is a diagram schematically illustrating a second operation example of the distributed antenna system in the case where there is a positional relationship in which a plurality of base stations and a plurality of user terminals are arranged on a straight line.

FIG. 3 is a diagram schematically illustrating a second operation example of the distributed antenna system 10 in the case where there is a positional relationship in which a plurality of base stations 30 and a plurality of user terminals 20 are arranged on a straight line.

In the second operation example of the distributed antenna system 10, for example, the base station 30-1 adopts the beam #2, and the base station 30-2 adopts the beam #5. At this time, the aggregation station 40 performs control so that each of the two base stations 30 arranged on the straight line non-orthogonally superimposes and multiplexes pieces of transmission data for the two respective user terminals 20 with a predetermined power difference or power ratio to increase gains for the respective user terminals 20 by cooperation of transmission beams transmitted by the two base stations 30 to the two respective user terminals 20.

That is, the aggregation station 40 may have a function of Coordinated Multi-Point (CoMP) with Joint Transmission (JT) of long term evolution (LTE)-Advanced.

Figure 4:
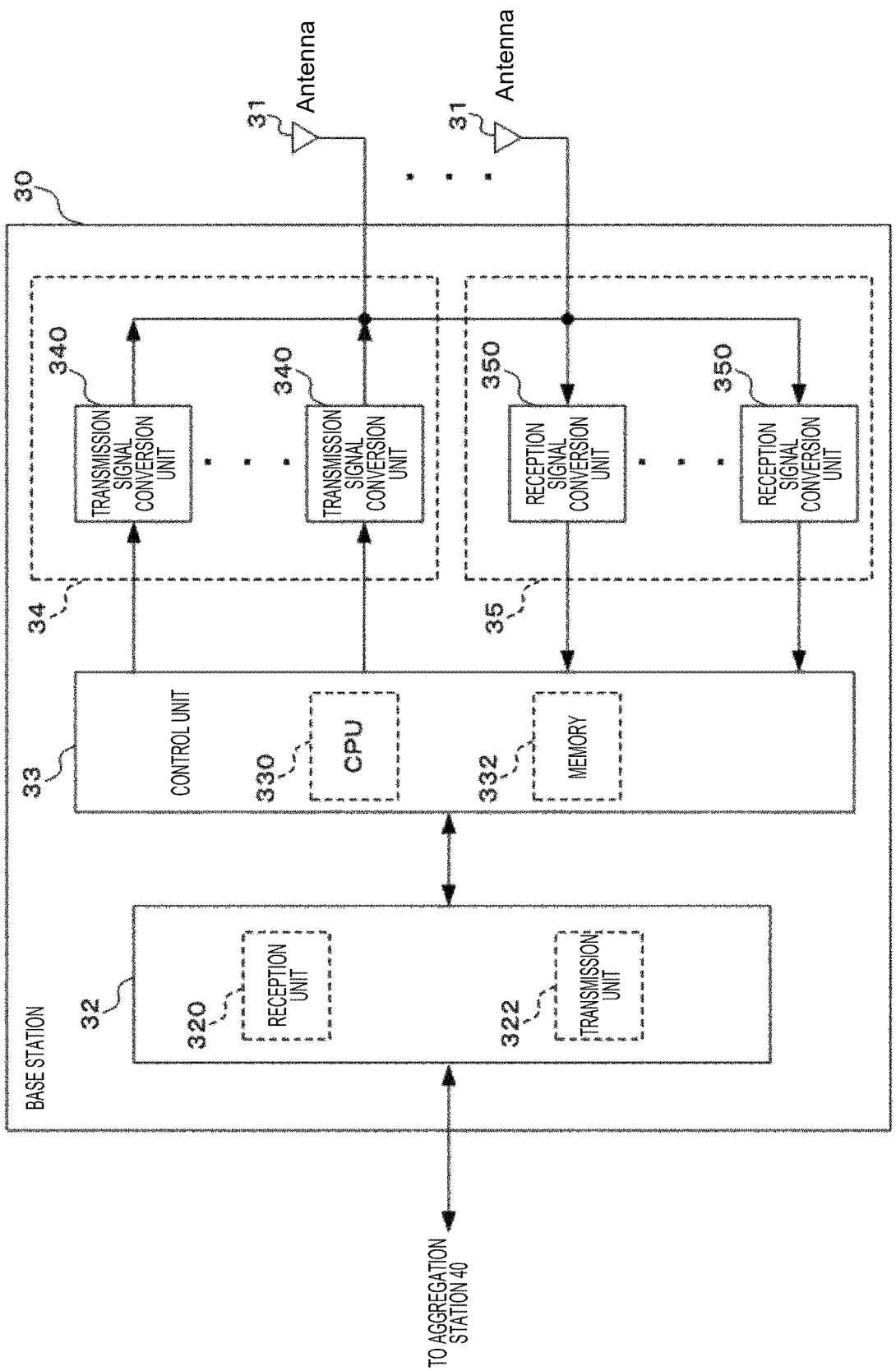
FIG. 4 is a functional block diagram illustrating functions of a base station.

Next, a specific configuration example of the base station 30 will be described. FIG. 4 is a functional block diagram illustrating functions of the base station 30. As illustrated in FIG. 4, the base station 30 includes a plurality of antennas 31, a communication unit 32, a control unit 33, a transmission unit 34, and a reception unit 35.

Each of the plurality of antennas 31 is connected to the transmission unit 34 and the reception unit 35, and enables MIMO transmission between the base station 30 and the user terminal 20.

The communication unit 32 includes a reception unit 320 and a transmission unit 322, and performs bidirectional communication with the aggregation station 40 via, for example, an optical fiber (not illustrated). The reception unit 320 receives information transmitted by the aggregation station 40 and outputs the received information to the control unit 33. The transmission unit 322 transmits information input from the control unit 33 to the aggregation station 40.

The control unit 33 includes, for example, a CPU 330 and a memory 332, and controls each unit constituting the base station 30. For example, the control unit 33 performs predetermined processing on the information input from the communication unit 32 and outputs the processed information to the transmission unit 34. In addition, the control unit 33 performs predetermined processing on information input from the reception unit 35, and outputs the processed information to the communication unit 32.

The transmission unit 34 includes a plurality of transmission signal conversion units 340. The transmission signal conversion unit 340 includes a pulse shaping (performing necessary band limitation by a roll off filter or the like) unit, a digital to analog conversion (DAC) unit, a radio frequency (RF) unit, and the like (not illustrated). Then, the transmission signal conversion unit 340 performs processing for converting a signal input from the control unit 33 into a high frequency signal and transmitting the high frequency signal from the antenna 31.

Then, the plurality of antennas 31 emits transmission beams in a predetermined direction, whereby the base station 30 transmits a signal to the user terminal 20 located in the predetermined direction. In addition, the base station 30 receives a beam transmitted by the user terminal 20 located in a predetermined direction by the plurality of antennas 31.

The reception unit 35 includes a plurality of reception signal conversion units 350. The reception signal conversion unit 350 includes an RF unit, an analog to digital conversion (ADC) unit, a pulse shaping unit, and the like (not illustrated). Then, the reception signal conversion unit 350 performs frequency conversion of the high frequency reception signal received by each of the plurality of antennas 31 into a low frequency baseband signal, and outputs the low frequency baseband signal to the control unit 33.

Here, the reception unit 35 receives communication path information (CSI) with each of the user terminals 20 accommodated in the base station 30 for each user terminal, and outputs the communication path information to the control unit 33. Note that the base station 30 may be configured such that the reception unit 35 receives a control signal for CSI, and the control unit 33 estimates CSI.

That is, the base station 30 may be configured to perform explicit beam forming, or may be configured to perform implicit beam forming.

Figure 5:
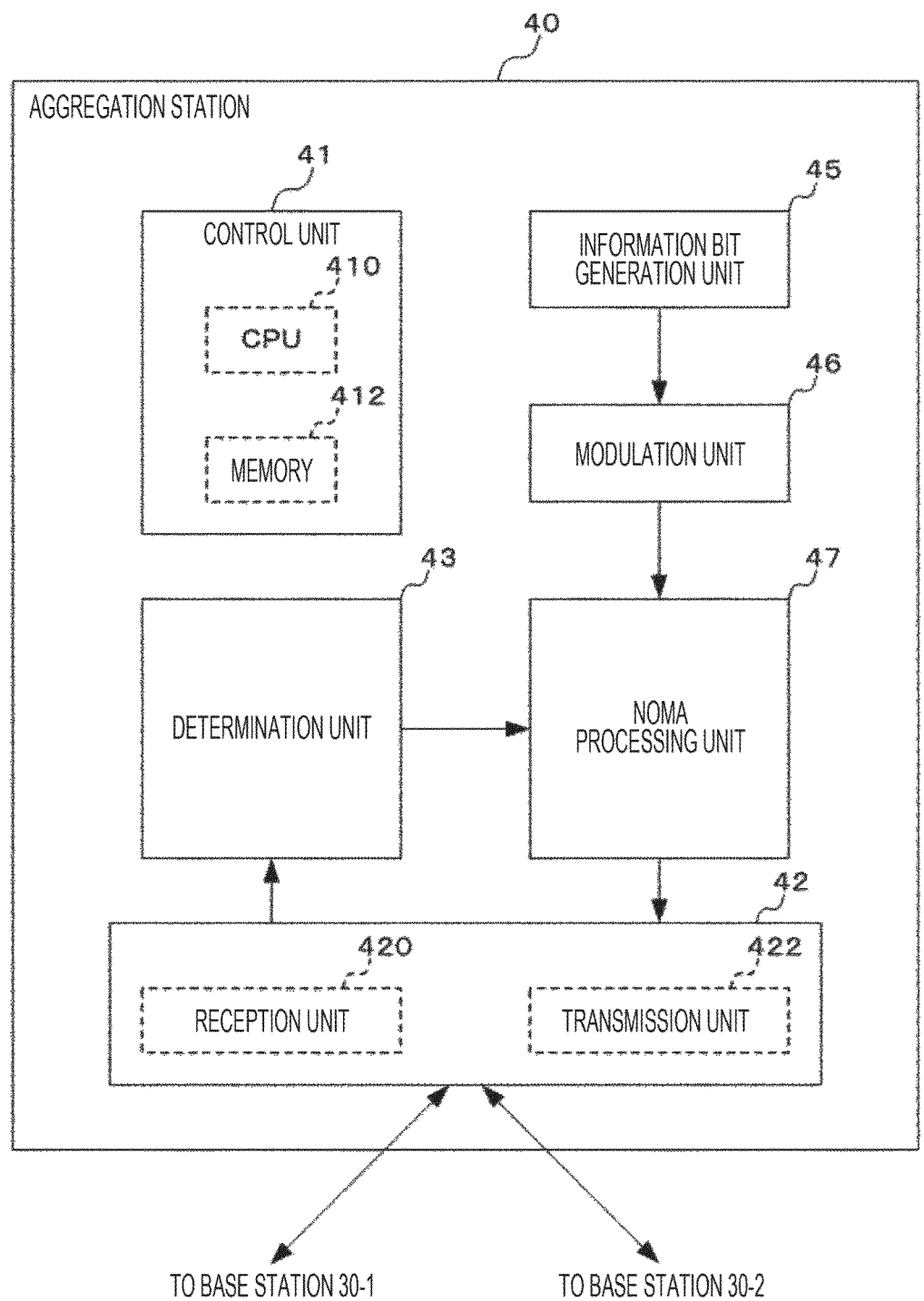
FIG. 5 is a functional block diagram illustrating functions of an aggregation station according to the embodiment.

Next, a specific configuration example of the aggregation station 40 will be described. FIG. 5 is a functional block diagram illustrating functions of the aggregation station 40 according to the embodiment. As illustrated in FIG. 5, the aggregation station 40 includes a control unit 41, a communication unit 42, a determination unit 43, an information bit generation unit 45, a modulation unit 46, and a NOMA processing unit 47.

The control unit 41 includes, for example, a CPU 410 and a memory 412, and controls each unit constituting the aggregation station 40. Note that a specific example of a function of the control unit 41 will be described later.

The communication unit 42 includes a reception unit 420 and a transmission unit 422, and performs bidirectional communication with each of the base station 30-1 and the base station 30-2 via, for example, an optical fiber (not illustrated). The reception unit 420 receives communication path information with each of the accommodated user terminals 20 from each of the base station 30-1 and the base station 30-2 for each user terminal, and outputs the communication path information to the determination unit 43. The transmission unit 422 transmits a signal (including first information and second information to be described later) output from the NOMA processing unit 47 to each of the base station 30-1 and the base station 30-2 depending on control of the control unit 41.

The determination unit 43 determines whether or not the two base stations 30 and the two user terminals 20 are arranged on a straight line on the basis of the communication path information for each user terminal 20 received by the reception unit 420, and outputs a determination result to the NOMA processing unit 47.

The information bit generation unit 45 generates data information bits to be transmitted to the base station 30-1 and the base station 30-2, respectively, and outputs the data information bits to the modulation unit 46. The data information bits are, for example, a bit string corresponding to a data signal input from the outside (not illustrated), a data signal generated inside, or the like. Note that the information bit generation unit 45 may have an error correction coding function that generates an error correction code at a predetermined coding rate, an interleaving function, and the like.

The modulation unit 46 modulates the data information bits generated by the information bit generation unit 45 for each of the base station 30-1 and the base station 30-2 by a predetermined modulation scheme (for example, quadrature amplitude modulation (QAM) or the like), and outputs each of modulated data signals to the NOMA processing unit 47.

In a case where the determination unit 43 determines that the two base stations 30 and the two user terminals 20 are arranged on the straight line, the NOMA processing unit 47 performs processing so that each of the base station 30-1 and the base station 30-2 can form a predetermined transmission beam for each data signal modulated by the modulation unit 46, and outputs a processing result to the transmission unit 422. That is, the NOMA processing unit 47 performs processing to prevent radio wave interference in the distributed antenna system 10.

For example, the NOMA processing unit 47 performs first processing or second processing described below by using the data signal modulated by the modulation unit 46, and outputs the processing result to the transmission unit 422.

For example, as the first processing, the NOMA processing unit 47 generates first information for performing setting so that a transmission beam of any one of the base stations 30 arranged on the straight line is stopped and the other of the base stations 30 non-orthogonally superimposes and multiplexes pieces of transmission data for the two respective user terminals 20 with a predetermined power difference or power ratio, and outputs the generated first information to the transmission unit 422.

For example, in the first processing, in a case where a transmission beam of any one of the base stations 30 arranged on the straight line is stopped, the NOMA processing unit 47 generates the first information so that transmission power of a transmission beam transmitted by the other of the base stations 30 is transmission power for two base stations 30.

In addition, for example, as the second processing, the NOMA processing unit 47 generates second information for performing setting so that each of the two base stations 30 arranged on the straight line non-orthogonally superimposes and multiplexes pieces of transmission data for the two respective user terminals 20 with a predetermined power difference or power ratio to increase gains of the respective user terminals 20 by cooperation of transmission beams transmitted by the two base stations 30 to the two respective user terminals 20, and outputs the generated second information to the transmission unit 422.

That is, the NOMA processing unit 47 may have a function of CoMP with JT of LTE-Advanced. At this time, the NOMA processing unit 47 performs processing for causing the base station 30-1 and the base station 30-2 to perform cooperative operation of simultaneously transmitting phase-aligned signals to perform coherent transmission to the user terminals 20 to intensify the signals at reception points without interference of the signals with each other.

In addition, in a case where the determination unit 43 determines that the two base stations 30 and the two user terminals 20 are not arranged on the straight line, the NOMA processing unit 47 generates information for the base station 30-1 and the base station 30-2 to perform the above-described normal operation, and outputs the information to the transmission unit 422.

Then, as described above, the transmission unit 422 transmits the signal (processing result) output by the NOMA processing unit 47 to each of the base station 30-1 and the base station 30-2 depending on the control of the control unit 41.

That is, the control unit 41 has a function of controlling the transmission beams of the two base stations 30 arranged on the straight line on the basis of the first information or the second information described above.

As described above, in the distributed antenna system 10 according to the embodiment, since the aggregation station 40 performs the first processing or the second processing, it is possible to prevent radio wave interference even in a case where there is a positional relationship in which the plurality of base stations 30 and the plurality of user terminals 20 are arranged on a straight line.

In addition, some or all of the functions of each of the base station 30 and the aggregation station 40 may be configured by hardware such as a programmable logic device (PLD) or a field programmable gate array (FPGA) or may be configured as a program executed by a processor such as a CPU.

For example, the base station 30 and the aggregation station 40 can be implemented by using a computer and a program, and the program can be recorded in a storage medium or provided through a network.

REFERENCE SIGNS LIST 10 distributed antenna system
20 user terminal
30-1, 30-2 base station
31 antenna
32 communication unit
33 control unit
34 transmission unit
35 reception unit
40 aggregation station
41 control unit
42 communication unit
43 determination unit
45 information bit generation unit
46 modulation unit
47 NOMA processing unit
320 reception unit
322 transmission unit
330 CPU
332 memory
340 transmission signal conversion unit
350 reception signal conversion unit
410 CPU
412 memory
420 reception unit
422 transmission unit

The invention claimed is:

1. A distributed antenna system comprising:
a plurality of base stations that performs MIMO (multiple input multiple output) transmission to user terminals at an identical frequency; and
an aggregation station that aggregates pieces of information used by the respective base stations, the aggregation station including:
reception circuitry configured to receive, from each of the base stations, communication path information with each of accommodated user terminals, for each user terminal;
determination circuitry configured to determine whether or not two of the base stations and two user terminals are arranged on a straight line on a basis of the communication path information for each user terminal received by the reception circuitry;
NOMA (non-orthogonal multiple access) processing circuitry configured to perform, in a case where the determination circuitry determines that the two of the base stations and the two user terminals are arranged on the straight line, first processing of generating first information for performing setting such that a transmission beam of any one of the base stations arranged on the straight line is stopped and another of the base stations non-orthogonally superimposes and multiplexes pieces of transmission data for the two respective user terminals with a predetermined power difference or power ratio, or second processing of generating second information for performing setting such that each of the two of the base stations arranged on the straight line non-orthogonally superimposes and multiplexes pieces of transmission data for the two respective user terminals with a predetermined power difference or power ratio to increase gains for the respective user terminals by cooperation of transmission beams transmitted by the two of the base stations to the two respective user terminals; and
control circuitry configured to control the transmission beam of each of the two of the base stations arranged on the straight line on a basis of the first information or the second information.

2. The distributed antenna system according to claim 1, wherein:
the NOMA processing circuitry is further configured to perform, in a case where the transmission beam of any one of the base stations arranged on the straight line is stopped, first processing of generating the first information such that transmission power of a transmission beam transmitted by another of the base stations is transmission power for two of the base stations.

3. A wireless communication method, comprising:
receiving, from each of a plurality of base stations that performs MIMO (multiple input multiple output) transmission, communication path information with each of accommodated user terminals, for each user terminal, by an aggregation station that aggregates pieces of information used by base stations;
determining whether or not two of the base stations and two user terminals are arranged on a straight line on a basis of the communication path information for each user terminal received;
performing, in a case where it is determined that the two of the base stations and the two user terminals are arranged on the straight line, first processing of generating first information for performing setting such that a transmission beam of any one of the base stations arranged on the straight line is stopped and another of the base stations non-orthogonally superimposes and multiplexes pieces of transmission data for the two respective user terminals with a predetermined power difference or power ratio, or second processing of generating second information for performing setting such that each of the two of the base stations arranged on the straight line non-orthogonally superimposes and multiplexes pieces of transmission data for the two respective user terminals with a predetermined power difference or power ratio to increase gains for the respective user terminals by cooperation of transmission beams transmitted by the two of the base stations to the two respective user terminals; and
controlling the transmission beam of each of the two of the base stations arranged on the straight line on a basis of the first information or the second information.

4. The wireless communication method according to claim 3, wherein in the performing,
in a case where the transmission beam of any one of the base stations on the straight line is stopped, first processing of generating the first information is performed such that transmission power of a transmission beam transmitted by another of the base stations is transmission power for two of the base stations.

5. An aggregation station that aggregates pieces of information used by a plurality of respective base stations that performs MIMO (multiple input multiple output) transmission to user terminals at an identical frequency, the aggregation station comprising:
reception circuitry configured to receive, from each of the base stations, communication path information with each of accommodated user terminals, for each user terminal;
determination circuitry configured to determine whether or not two of the base stations and two user terminals are arranged on a straight line on a basis of the communication path information for each user terminal received by the reception circuitry unit;
NOMA (non-orthogonal multiple access) processing circuitry configured to perform, in a case where the determination circuitry determines that the two of the base stations and the two user terminals are arranged on the straight line, first processing of generating first information for performing setting such that a transmission beam of any one of the base stations arranged on the straight line is stopped and another of the base stations non-orthogonally superimposes and multiplexes pieces of transmission data for the two respective user terminals with a predetermined power difference or power ratio, or second processing of generating second information for performing setting such that each of the two of the base stations arranged on the straight line non-orthogonally superimposes and multiplexes pieces of transmission data for the two respective user terminals with a predetermined power difference or power ratio to increase gains for the respective user terminals by cooperation of transmission beams transmitted by the two of the base stations to the two respective user terminals; and
control circuitry configured to perform the transmission beam of each of the two of the base stations arranged on the straight line on a basis of the first information or the second information.

6. The aggregation station according to claim 5, wherein:
the NOMA processing circuitry is configured to perform, in a case where the transmission beam of any one of the base stations arranged on the straight line is stopped, first processing of generating the first information such that transmission power of a transmission beam transmitted by another of the base stations is transmission power for two of the base stations.

* * * * *